E. P. CAMPBELL.
DEVICE FOR LOOSENING OUTER RACES OF BALL BEARINGS.
APPLICATION FILED SEPT. 18, 1916.

1,241,819.

Patented Oct. 2, 1917.

WITNESS

Clarence M. Smith

INVENTOR.
Ernst P. Campbell
BY
ATTORNEY

UNITED STATES PATENT OFFICE.

ERNST P. CAMPBELL, OF STOCKTON, CALIFORNIA, ASSIGNOR OF ONE-HALF TO JOSEPH E. GOODMAN, OF STOCKTON, CALIFORNIA.

DEVICE FOR LOOSENING OUTER RACES OF BALL-BEARINGS.

1,241,819.    Specification of Letters Patent.    Patented Oct. 2, 1917.

Application filed September 18, 1916. Serial No. 120,816.

*To all whom it may concern:*

Be it known that I, ERNST P. CAMPBELL, a citizen of the United States, residing at Stockton, in the county of San Joaquin, State of California, have invented certain new and useful Improvements in Devices for Loosening Outer Races of Ball-Bearings; and I do declare the following to be a full, clear, and exact description of the same, reference being had to the accompanying drawings, and to the characters of reference marked thereon, which form a part of this application.

This invention relates to improvements in a device for taking out a portion of bearings such as ball bearings on magneto shafts or similar devices, the object of the invention being especially for the purpose of loosening the outer race of the bearing which is usually set by frictional contact into an end plate or similar structure. These are so tightly fitted that there is no way of loosening them by the present day methods other than by boring a hole through the back plate and tapping them out.

By means of my improved structure however, I figure to start them by a slight wedging action which will loosen them from the rear and permit them to thereafter be easily pulled from the recess. My improved invention is particularly adapted for use in connection with my bearing puller upon which I have a patent dated February 15, 1916, No. 1,171,590. While my invention as stated is especially adapted for use in connection with the device as shown in the above patent still it is not necessarily limited to use in such connection but can be used independently as will be readily apparent.

My new invention embodies radially moving fingers having sharp wedge shaped edges which, when the finger members are expanded, wedge in behind the bearing collar and start it from its position, all as will presently appear.

A further object of the invention is to produce a simple and inexpensive device and yet one which will be exceedingly effective for the purposes for which it is designed.

These objects I accomplish by means of such structure and relative arrangement of the parts as will fully appear by a perusal of the following specification and claims.

In the drawings similar characters of reference indicate corresponding parts in the several views.

Figure 1:
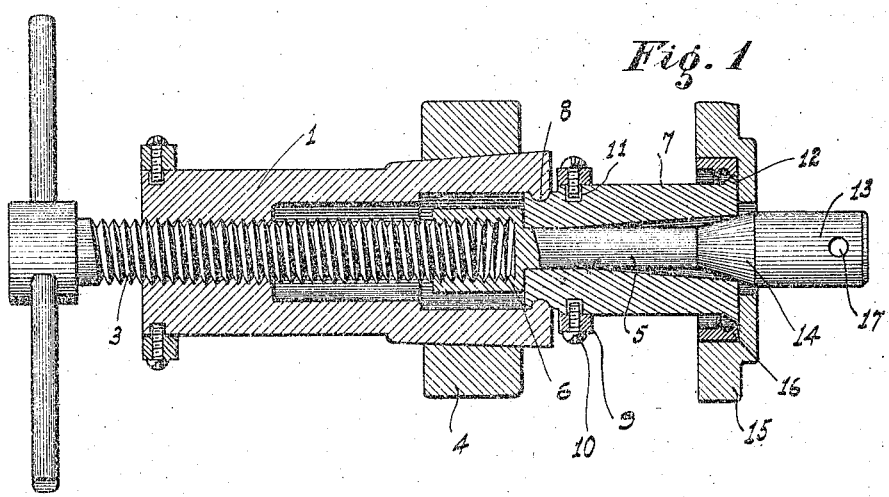
Figure 1 is a sectional view showing the device ready for action in loosening an outer race for bearings.
Figure 3:
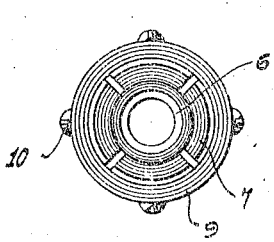
Fig. 3 is a rear end view of the structure shown in Fig. 2.
Figure 2:
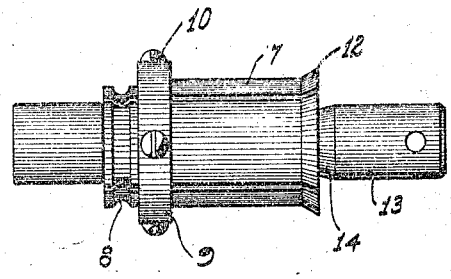
Fig. 2 is a side elevation of the device.
Figure 4:
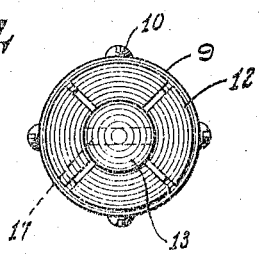
Fig. 4 is a front end view of the same.

Referring now more particularly to the characters of reference on the drawings, and referring especially to Fig. 1, the left hand portion of said Fig. 1 shows the device covered by my said patent indicated above.

This consists of the radial moving fingers 1 mounted on the threaded pin 3 and provided with the collar 4 which encircles the finger members 1 to clamp them around objects and especially around my improved invention, as will appear.

My said improved invention comprises a pin 5 having an enlarged end 6 provided with interior threads adapted to allow the pin 5 to be threaded upon the pin 3. Mounted upon the pin 5 are a plurality of finger members 7 forming in their entirety a substantially cylindrical member surrounding the pin 5 and normally abutting against the enlarged end 6. These finger members 7 adjacent the member 6 are provided with a plurality of grooves 8 forming in their entirety an annular groove arranged to be engaged and clamped by the finger members 1 as shown in Fig. 1 to hold my improved tool tightly in engagement with the finger members 1 and thereupon the threaded member 6 is engaged with the threaded pin 3 for a purpose as will presently appear.

The finger members 7 are held together by means of a surrounding collar 9 having set screws 10 projected therethrough and into recesses 11 in the said finger members 7. Said recesses 11 are of a larger diameter than the set screws 10 to allow the finger members 7 to have a radial movement upon the pin 5. The inner surfaces of the members 7 taper slightly from their inner to their outer ends. The outer edges of the outer ends of the members 7 are provided with sharp wedge-shaped flanges 12. The pin 5 at its outer end projects beyond the finger members 7 and is enlarged, as at 13, with a tapering shoulder 14 extending from the enlarged end 13 to the pin 5 immediately adjacent the outer ends of the finger members 7.

The numeral 15 designates the face plate of the mechanism carrying the bearing and the numeral 16 designates the bearing race fitted within the recess therein and which it is desired to remove by the use of my improved tool, which removal is accomplished in the following manner:

The finger members 7 are projected into the recess until their ends project against the bottom thereof immediately adjacent the collar 16. A small bar or pin is then projected through the hole 17 in the enlarged end 13 and the said pin 5 is then turned to advance the threaded end 6 upon the pin 3. This causes the tapered shoulder 14 to advance against the ends of the finger members 7 and expand them. This expansion causes the sharp wedge-shaped members 12 to wedge in back of the race 16 and force it from its seat. Upon being started from its seat it is thereafter very easy to quickly remove the same. The expanding action of the fingers 7 is allowed of by reason of the radial movement which they have upon the pin 5.

From the foregoing description it will readily be seen that I have produced such a device as substantially fulfils the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention what I claim as new and useful and desire to secure by Letters Patent is:

A device of the character described comprising a pin having an interiorly threaded end and a tapered shoulder at the opposite end, a plurality of finger members disposed around said pin and each being provided with recesses, a collar disposed around the finger members adjacent said recesses, set screws projecting through the collar into the recesses, the diameter of the set screws being less than the diameter of the recesses, said finger members being tapered on their inner sides whereby they will have radial movement upon the pin with respect to each other, projecting wedge-shaped flanges on the outer edges of the finger members at the end opposite said collar, said tapered shoulder on the pin being arranged to project between the finger members to expand the same as the threaded end of the pin is advanced longitudinally of the finger members.

In testimony whereof I affix my signature.

ERNST P. CAMPBELL.